United States Patent
Gokurakuji

(10) Patent No.: US 11,767,187 B2
(45) Date of Patent: Sep. 26, 2023

(54) SHEET PROCESSING APPARATUS AND FOREIGN-OBJECT ENTRY DETERMINATION METHOD

(71) Applicant: Glory Ltd., Himeji (JP)

(72) Inventor: Taiki Gokurakuji, Hyogo (JP)

(73) Assignee: GLORY LTD., Himeji (JP)

(*) Notice: Subject to any disclaimer, the term of this patent is extended or adjusted under 35 U.S.C. 154(b) by 414 days.

(21) Appl. No.: 16/838,032

(22) Filed: Apr. 2, 2020

(65) Prior Publication Data
US 2020/0324989 A1 Oct. 15, 2020

(30) Foreign Application Priority Data
Apr. 11, 2019 (JP) .................. 2019-075394

(51) Int. Cl.
*B65H 7/02* (2006.01)
*B65H 5/06* (2006.01)
*G01V 3/10* (2006.01)

(52) U.S. Cl.
CPC ............... *B65H 7/02* (2013.01); *B65H 5/062* (2013.01); *G01V 3/10* (2013.01)

(58) Field of Classification Search
CPC ............ B65H 7/02; B65H 5/062; G01V 3/10
See application file for complete search history.

(56) References Cited

U.S. PATENT DOCUMENTS

| 4,433,528 A | * | 2/1984 | Bohman | A01D 75/187 340/684 |
| 4,883,264 A | * | 11/1989 | Yoshikawa | G07D 11/50 271/155 |
| 2004/0129771 A1 | | 7/2004 | Landwehr et al. | |
| 2013/0241300 A1 | | 9/2013 | Miyamoto | |
| 2015/0198561 A1 | | 7/2015 | Momose | |
| 2017/0174457 A1 | * | 6/2017 | Hirota | B65H 5/068 |
| 2020/0331719 A1 | * | 10/2020 | Allman | G03G 15/6502 |

FOREIGN PATENT DOCUMENTS

| DE | 101 05 082 A1 | 8/2002 |
| JP | 1-230190 A | 9/1989 |
| JP | 8-335288 A | 12/1996 |
| JP | 2001-084426 A | 3/2001 |
| JP | 2004-028708 A | 1/2004 |
| JP | 2013-192391 A | 9/2013 |
| JP | 2018-010586 A | 1/2018 |
| KR | 10-2014-0083321 A | 7/2014 |
| WO | 2009/040941 A1 | 4/2009 |
| WO | 2014/155866 A1 | 10/2014 |

OTHER PUBLICATIONS

Australian Office Action dated Sep. 10, 2020, issued in corresponding Australian Patent Application No. 2020202465.
Extended European Search Report dated Aug. 14, 2020 in European Patent Application No. 20167951.1, 7 pages.

* cited by examiner

*Primary Examiner* — Thomas A Morrison
(74) *Attorney, Agent, or Firm* — XSENSUS LLP

(57) ABSTRACT

A sheet processing apparatus includes a plurality of coils that are provided in a feeding section which feeds a sheet that has been taken in into a transport path and that generate magnetic fields and a control section that determines, on the basis of differential values between signals output from the plurality of coils, whether a foreign object has entered the feeding section.

16 Claims, 10 Drawing Sheets

SHEET PROCESSING APPARATUS AND FOREIGN-OBJECT ENTRY DETERMINATION METHOD

CROSS REFERENCE TO RELATED APPLICATIONS

This application is entitled to the benefit of Japanese Patent Application No. 2019-075394, filed on Apr. 11, 2019, the disclosure of which including the specification, drawings and abstract is incorporated herein by reference in its entirety.

TECHNICAL FIELD

The present disclosure relates to a sheet processing apparatus and a foreign-object entry determination method.

BACKGROUND ART

An apparatus in which coils are provided for a banknote stage and detect entry of a piece of metal has been disclosed (e.g., refer to PTL 1). In addition, an apparatus in which banknotes are set upright, for which coils are provided, and that detects entry of a piece of metal has been disclosed (e.g., refer to PTL 2).

CITATION LIST

Patent Literature

PTL 1
Japanese Patent Application Laid-Open No. H1-230190
PTL 2
Japanese Patent Application Laid-Open No. H8-335288

SUMMARY

The present disclosure is directed to a sheet processing apparatus comprising: a plurality of coils that are provided in an interface which feeds a sheet that has been taken in into a transport path and that generate magnetic fields; and circuitry that determines, on a basis of differential values between signals output from the plurality of coils, whether a foreign object has entered the feeding section.

DESCRIPTION OF EMBODIMENTS

Figure 1:
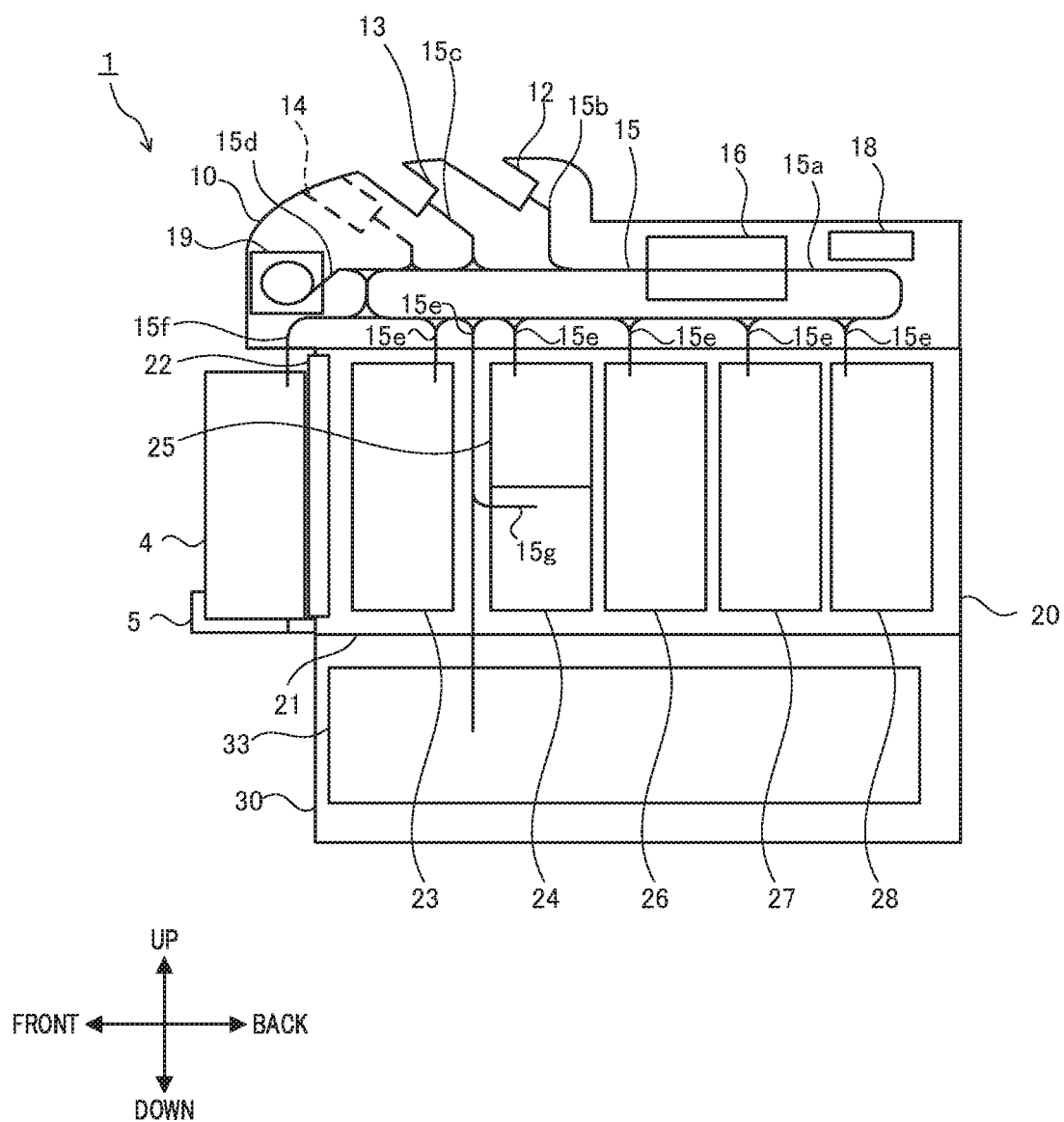
FIG. 1 is a diagram illustrating an example of the configuration of a sheet processing apparatus according to an embodiment of the present disclosure.

In PTL 1 and PTL 2, signals output from coils might change due to an effect of an environment, and a piece of metal might not be accurately detected. The effect of the environment is, for example, an effect of surrounding temperature. There is a technique for correcting the effect of surrounding temperature using a temperature sensor, a reference coil, or the like, but the number of parts increases in this case.

The present disclosure, therefore, aims to provide a technique for improving the accuracy of detecting entry of a foreign object while suppressing an increase in the number of parts.

A sheet processing apparatus of the present disclosure comprises: a plurality of coils that are provided in an interface which feeds a sheet that has been taken in into a transport path and that generate magnetic fields; and circuitry that determines, on a basis of differential values between signals output from the plurality of coils, whether a foreign object has entered the feeding section.

According to the present disclosure, it is made possible to improve the accuracy of detecting entry of a foreign object while suppressing an increase in the number of parts.

An embodiment of the present disclosure will be described hereinafter with reference to the drawings. A sheet processing apparatus will be described using banknotes as an example of sheets. The sheets, however, are not limited to banknotes, and may be securities such as notes or checks, instead. In addition, the sheets need not be composed of paper, but may be a material other than paper shaped in the form of sheets or a material other than paper pasted on paper and formed in the shape of sheets. The material other than paper is, for example, a resin. In the drawings, components are schematically illustrated in order to facilitate understanding. Arrows in the drawings indicate up, down, front, and back directions for the sake of convenience.

FIG. 1 is a diagram illustrating an example of the configuration of the sheet processing apparatus according to the embodiment of the present disclosure. A sheet processing apparatus 1 is a banknote depositing and dispensing machine. The sheet processing apparatus 1 comprises an upper case 10 and a lower case 20.

The upper case 10 comprises, in an upper part, an inlet section 12 in which banknotes to be fed into are disposed and an outlet section 13 in which banknotes to be fed out are disposed. The upper case 10 also comprises, inside thereof, a transport section 15 that transports banknotes, an identification section 16 that identifies banknotes, a control section 18 that controls other components of the sheet processing apparatus 1, and a temporary storage section 19 that temporarily stores banknotes. A second outlet section 14 may be provided adjacent to the outlet section 13. The configuration of the second outlet section 14 may be the same as that of the outlet section 13 or may be different from that of the outlet section 13.

In the inlet section 12, a feeding section (e.g., refer to FIG. 2) that feeds banknotes to the transport section 15 one by one at certain time intervals is provided. In the outlet section 13, a stacking section (not illustrated) that stacks transported banknotes on one another is provided.

The transport section 15 is a transport apparatus that transports banknotes at a certain transport speed. The transport section 15 comprises a belt mechanism and a roller mechanism for transporting banknotes. The transport section 15 comprises a loop transport path 15a that transports banknotes in a looped manner, and a first branch path 15b, a second branch path 15c, a third branch path 15d, fourth branch paths 15e, and a fifth branch path 15f that diverge from the loop transport path 15a. The first to fifth branch paths 15b to 15f may be regarded as part of the loop transport path 15a.

The first to fifth branch paths 15b to 15f connect the loop transport path 15a to the inlet section 12, the outlet section 13, the temporary storage section 19, a first storage 21 and a second storage 30, which will be described later, and a detachable storage section 4, which will be described later, respectively. Diverters (not illustrated) for distributing banknotes are provided at connections between the first to fifth branch paths 15b to 15f and the loop transport path 15a. When the second outlet section 14 is provided, another branch path that connects the loop transport path 15a to the second outlet section 14 may also be provided.

The identification section 16 is an identification apparatus that reads information on banknotes and that identifies the banknotes. The identification section 16 comprises a sensor such as an image sensor, an optical sensor, or a magnetic sensor and identifies banknote information regarding banknotes transported by the transport section 15, such as authenticity, denomination, fitness, and serial numbers.

A serial number is a unique number given to each banknote and is, for example, a 10-digit character string comprising alphabets and numbers. The identification section 16 identifies 10 characters of each serial number.

The temporary storage section 19 is a storage apparatus that temporarily stores banknotes. The temporary storage section 19 can take in and stores banknotes one by one and feeds out the stored banknotes one by one.

The temporary storage section 19 is, for example, a storage section of a winding type, in which banknotes are wound around a rotating body. Alternatively, the temporary storage section 19 may be a storage section of a stacking type, in which banknotes are stacked on one another.

The control section 18 is a control apparatus comprising a processing section such as a CPU and a storage section such as a memory. The control section 18 controls, through the transport section 15, the components of the sheet processing apparatus 1 and the detachable storage section 4 such that banknotes are transported between the inlet section 12, the outlet section 13, the temporary storage section 19, the first storage 21 and the second storage 30, which will be described later, and the detachable storage section 4, which will be described later.

The lower case 20 comprises the first storage 21 and the second storage 30, which is provided under the first storage 21.

The first storage 21 is, for example, a safe. A lockable storage door 22 is provided on a front surface of the first storage 21.

In the first storage 21, a first storage section 23, a second storage section 24, a third storage section 25, which is provided over the second storage section 24, a fourth storage section 26, a fifth storage section 27, and a sixth storage section 28 are provided in this order from the front to the back. One of the fourth branch paths 15e that extends from the loop transport path 15a toward the second storage 30 is disposed between the first storage section 23 and the second and third storage section 24 and 25.

The fourth branch paths 15e that diverge from the loop transport path 15a are connected to the first storage section 23 and the third to sixth storage sections 25 to 28. A sixth branch path 15g, which diverges from the fourth branch paths 15e extending from the loop transport path 15a toward the second storage 30, is connected to the second storage section 24.

The first to sixth storage sections 23 to 28 are storage sections of the stacking type, in which banknotes are stacked on one another. Alternatively, the first to sixth storage sections 23 to 28 may be storage sections of the winding type, in which banknotes are wound around a rotating body. Banknotes sorted in accordance with results of identification performed by the identification section 16 are stored in the first to sixth storage sections 23 to 28.

A sensor (not illustrated) that detects passing banknotes is provided at an entrance of each of the first to sixth storage sections 23 to 28. The sensor is an optical sensor comprising a light emission section that emits light such as infrared light and a light reception section that receives light emitted from the light emission section. Any type of sensor may be used insofar as the sensor can detect storage of banknotes in a corresponding storage section.

The second storage 30 is, for example, a safe. The second storage 30 comprises a collection section 33 inside thereof. The collection section 33 comprises a storage area inside thereof, and the storage area stores banknotes collected from among ones taken in from the inlet section 12 and ones stored in the first storage 21. The collection section 33 is connected to one of the fourth branch paths 15e that diverge from the loop transport path 15a.

After banknotes to be collected are stored in the collection section 33, a collector collects the banknotes from the collection section 33. Alternatively, after banknotes to be collected are stored in the collection section 33, a collector removes the collection section 33 from the sheet processing apparatus 1 together with the banknotes.

The lower case 20 comprises a mounting section 5 for mounting the detachable storage section 4 on a front outer surface of the first storage 21. The outer front surface of the first storage 21 refers to an outer front surface of the first storage 21 that can be accessed without unlocking the storage door 22, that is, more specifically, an outer front surface of the lower case 20 or a front surface of the storage door 22.

The mounting section 5 comprises a fixing medium for fixing the detachable storage section 4 mounted on the mounting section 5. The fixing medium may comprise a locking apparatus.

The mounting section 5 comprises a terminal (not illustrated) for supplying control signals from the control section 18 to the detachable storage section 4. The detachable storage section 4 comprises a terminal (not illustrated) connected to the terminal of the mounting section 5.

When the detachable storage section 4 is mounted on the mounting section 5, the terminal of the detachable storage section 4 is directly or indirectly connected to the terminal of the mounting section 5. When the detachable storage section 4 is mounted on the mounting section 5, a storage area inside the detachable storage section 4 is connected to the fifth branch path 15f.

The detachable storage section 4 is a storage section of the stacking type, in which banknotes are stacked on one another. Alternatively, the detachable storage section 4 may be a storage section of the winding type, in which banknotes are wound around a rotating body.

The detachable storage section 4 comprises a driving mechanism (not illustrated), such as a motor, for taking in banknotes and discharging banknotes. Alternatively, when the detachable storage section 4 does not comprise the driving mechanism, the sheet processing apparatus 1 comprises the driving mechanism and transfers driving force to the detachable storage section 4 mounted on the mounting section 5.

Figure 2:
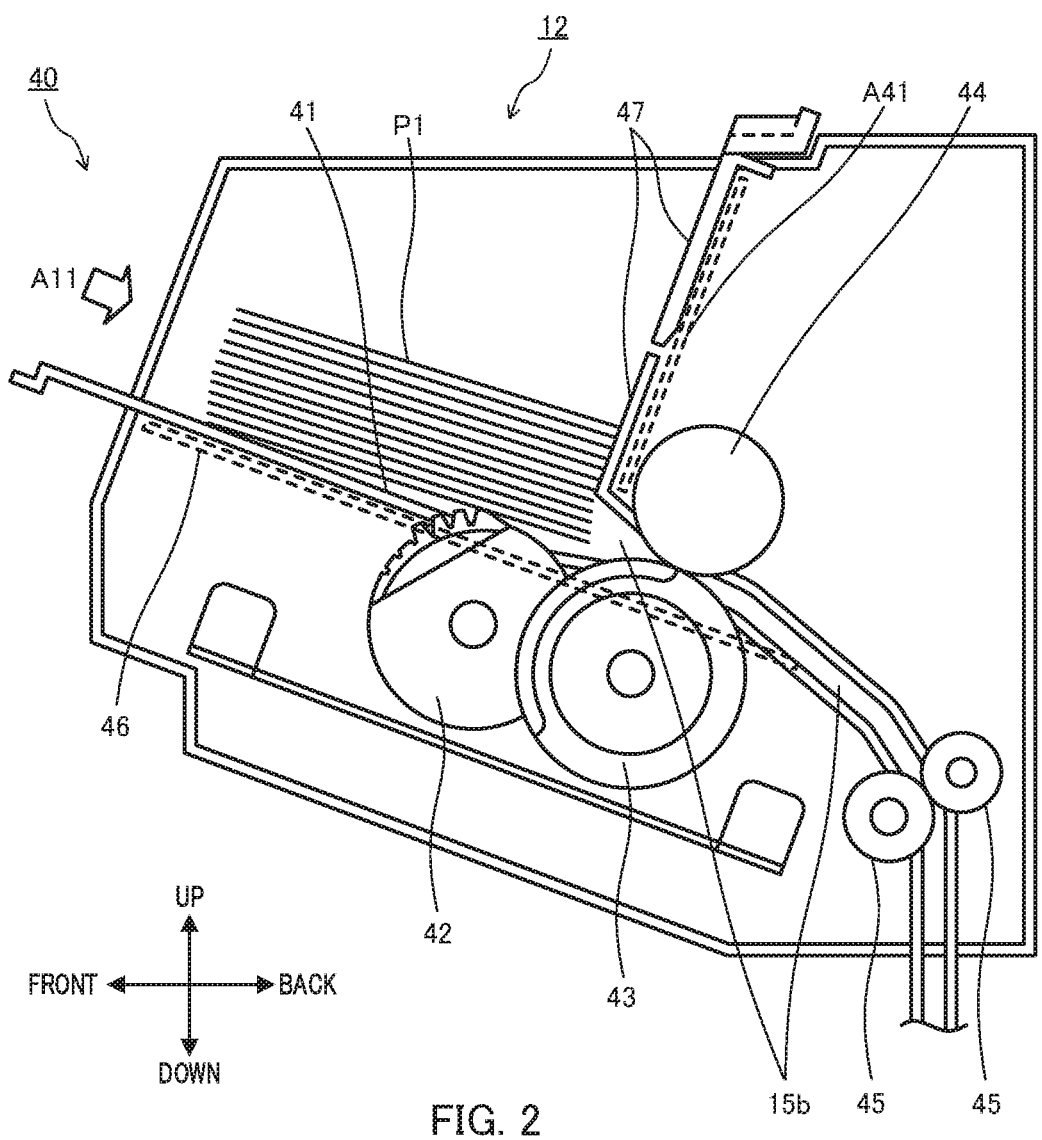
FIG. 2 is a diagram illustrating an example of the configuration of a feeding section provided for an inlet section.

FIG. 2 is a diagram illustrating an example of the configuration of a feeding section 40 provided for the inlet section 12. In FIG. 2, the same components as in FIG. 1 are given the same reference numerals. As illustrated in FIG. 2, the feeding section 40 comprises a stage 41, kicker rollers 42, feed rollers 43, gate rollers 44, transport rollers 45, a board 46, and banknote guides 47.

The stage 41 is arranged in such a way as to connect to an entrance of the first branch path 15b. The stage 41 is a flat, plate-like member, for example, on which banknotes P1 are stacked on one another. A bottom one of the banknotes P1 stacked on the stage 41 comes into contact with a surface of the stage 41. The banknotes P1 stacked on the stage 41 are fed into the first branch path 15b one by one from the bottom to the top, for example, in accordance with a deposit operation performed by a user.

The kicker rollers 42 are provided under the stage 41 and the board 46 such that part of the circumference thereof protrudes from the stage 41 and the board 46. The stage 41 and the board 46 are provided with openings for allowing the part of the circumference of the kicker rollers 42 to protrude.

The kicker rollers 42 rotate clockwise in FIG. 2. The kicker rollers 42 kick a bottom one of the banknotes P1 stacked on the stage 41 toward the first branch path 15b.

The feed rollers 43 are provided near the entrance of the first branch path 15b (at a slightly deeper position in the first branch path 15b than the entrance). The feed rollers 43 are provided under the first branch path 15b and the board 46 such that part of the circumference thereof protrudes from the first branch path 15b and the board 46. The first branch path 15b and the board 46 are provided with openings for allowing the part of the circumference of the feed rollers 43 to protrude.

The feed rollers 43 rotate clockwise in FIG. 2. The feed rollers 43 feed a bottom banknote kicked by the kicker rollers 42 into the first branch path 15b.

The gate rollers 44 face the feed rollers 43 from above the feed rollers 43. The circumference of the gate rollers 44 is in contact with the circumference of the feed rollers 43. The gate rollers 44 comprise a one-way clutch (not illustrated), for example, and can rotate clockwise in FIG. 2. As a result, banknotes passing through gaps between the feed rollers 43 and the gate rollers 44 are fed into the first branch path 15b one by one.

The transport rollers 45 are provided in the first branch path 15b. The transport rollers 45 feed banknotes fed from the feed rollers 43 into the loop transport path 15a.

The board 46 is provided under the stage 41 and the entrance of the first branch path 15b. The board 46 is provided with coils that detect foreign objects such as pieces of metal. The board 46 is provided in contact with or immediately below the stage 41 in order to efficiently detect, with the coils, a foreign object on the stage 41 or near the entrance of the first branch path 15b. A surface of the board 46 is parallel to the surface of the stage 41.

Figure 3:
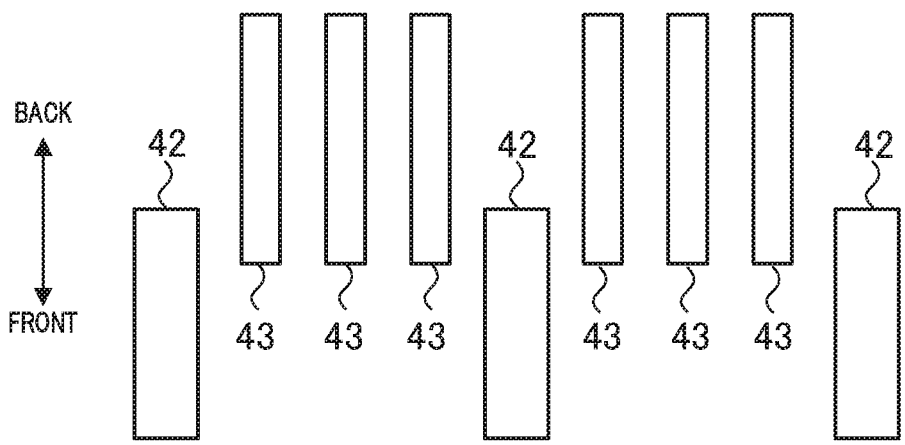
FIG. 3 is a diagram illustrating an example of arrangement of rollers when the feeding section is viewed from above.

FIG. 3 is a diagram illustrating an example of arrangement of the rollers at a time when the feeding section 40 is viewed from above. In FIG. 3, the same rollers as in FIG. 2 are given the same reference numerals. As illustrated in FIG. 3, the feeding section 40 comprises three kicker rollers 42 and six feed rollers 43. The number of kicker rollers 42 is not limited to three, and the number of feed rollers 43 is not limited to six.

Figure 4:
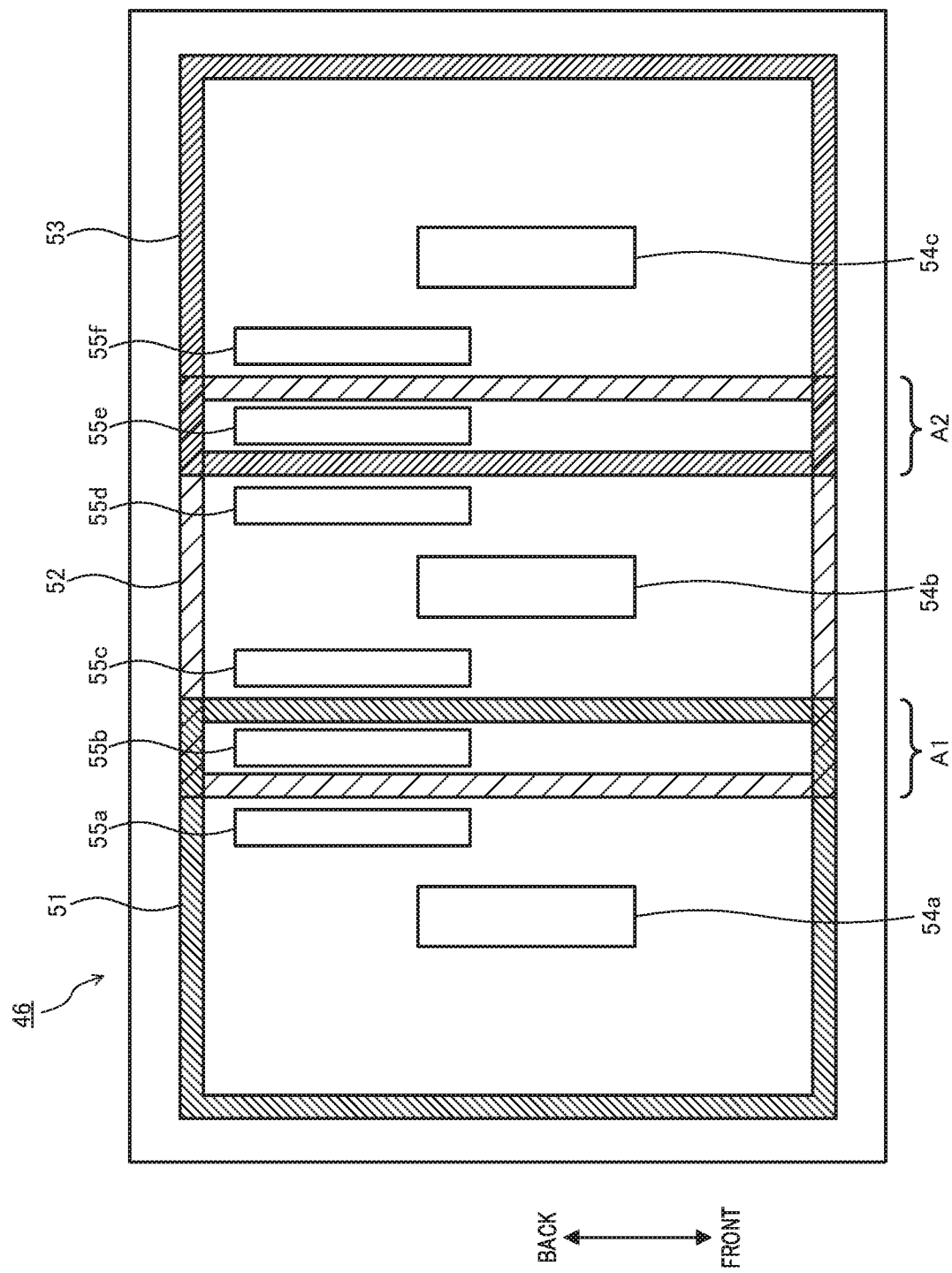
FIG. 4 is a diagram illustrating an example of the configuration of a board.

FIG. 4 is a diagram illustrating an example of the configuration of the board 46. As illustrated in FIG. 4, the board 46 comprises coils 51 to 53 and openings 54a to 54c and 55a to 55f.

The board 46 is, for example, a multilayer board. The coils 51 to 53 are formed on a surface of the multilayer board or within a certain layer. The coils 51 to 53 illustrated in FIG. 4 are hatched for the purpose of distinction.

Figure 5:
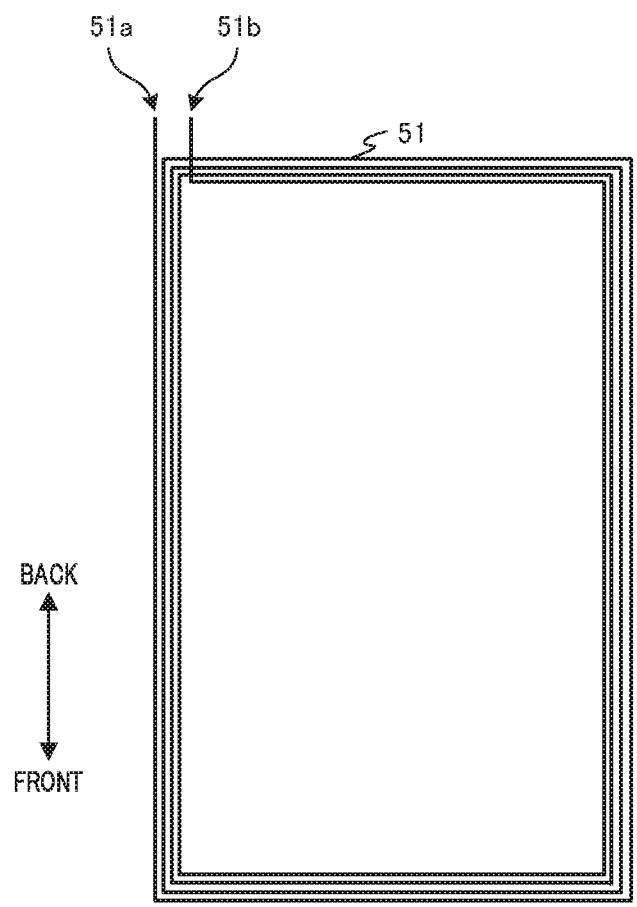
FIG. 5 is a diagram illustrating an example of the configuration of a coil.

FIG. 5 is a diagram illustrating an example of the configuration of the coil 51. As illustrated in FIG. 5, the coil 51 is rectangular and spirally wound on a plane.

A current or a voltage is supplied to terminals 51a and 51b of the coil 51 illustrated in FIG. 5 in accordance with control performed by the control section 18. The coil 51 generates a magnetic field from the current or the voltage supplied in accordance with the control performed by the control section 18.

The coils 52 and 53 have the same shape as the coil 51 and are spirally wound on a plane. The number of turns is the same between the coils 51, 52, and 53. The number of turns of the coil 51 is four in FIG. 5, but is not limited to this.

FIG. 4 is referred to again. As described above, the coils 51 to 53 generate magnetic fields in accordance with the control (supply of a current or a voltage) performed by the control section 18. The coils 51 to 53 are wound spirally on planes in the board 46 in a rectangular manner. A magnetic field at the center of the coil 51 is generated in such a way as to penetrate through the board 46 vertically. Magnetic fields at the centers of the coils 52 and 53 are also generated in such a way as to penetrate through the board 46 vertically.

As illustrated in FIG. 2, the board 46 is provided in contact with or immediately below the stage 41. The surface of the board 46 is parallel to the surface of the stage 41. As a result, surfaces of the coils 51 to 53 formed in the board 46 are parallel to the surface of the stage 41, on which the banknotes P1 are stacked. Alternatively, the surfaces of the coils 51 to 53 formed in the board 46 are parallel to surfaces of the banknotes P1 stacked on the stage 41. The magnetic fields of the coils 51 to 53, therefore, are generated above the stage 41 near the entrance of the first branch path 15b, that is, in a space where the banknotes P1 are stacked (a space inside the inlet section 12 in which the banknotes P1 are taken). In other words, the magnetic fields of the coils 51 to 53 are generated in a space above the stage 41 near the first branch path 15b that a foreign object might enter.

The coils 51 to 53 are arranged such that adjacent coils partially overlap with each other. The coils 51 to 53 are arranged side by side in a direction parallel to the surfaces of the banknotes P1 stacked on the feeding section 40 or the surface of the stage 41 on which the banknotes P1 are stacked, and perpendicular to a feeding direction of the banknotes P1 (from "front" to "back" in FIG. 4). The adjacent coils 51 and 52, for example, partially overlap with each other in an area A1. The adjacent coils 52 and 53 partially overlap with each other in an area A2.

The coils 51 to 53 are provided for the board 46 in correspondence with the arrangement of the kicker rollers 42. For example, the coil 51 corresponds to the left kicker rollers 42 illustrated in FIG. 3. The coil 52 corresponds to the central kicker rollers 42 illustrated in FIG. 3. The coil 53 corresponds to the right kicker rollers 42 illustrated in FIG. 3.

When viewed in a direction perpendicular to the stage 41, that is, in a direction perpendicular to the surfaces of the coils 51 to 53, the surfaces of the coils 51 to 53 may overlap the corresponding kicker rollers 42. Alternatively, the coils 51 to 53 may be provided in such a way as to surround the corresponding kicker rollers 42. Alternatively, the coils 51 to 53 may be provided for the board 46 such that the corresponding kicker rollers 42 are located at the centers of the coils 51 to 53. Two adjacent ones of the coils 51 to 53 may corresponding to the same feed roller 43. For example, the coils 51 and 52 correspond to the second leftmost feed roller 43 illustrated in FIG. 3. The coils 52 and 53 correspond to the second rightmost feed roller 43 illustrated in FIG. 3. When viewed in the direction perpendicular to the stage 41, that is, in the direction perpendicular to the surfaces of the coils 51 to 53, two adjacent coils may overlap one of the feed rollers 43. Alternatively, two adjacent coils may be provided in such a way as to surround one of the feed rollers 43.

The openings 54a to 54c allow part of the circumference of the three kicker rollers 42 illustrated in FIG. 3 to protrude. The openings 55a to 55f allow part of the circumference of the six feed rollers 43 illustrated in FIG. 3 to protrude. Since the board 46 comprises openings 54a to 54c and 55a to 55f, the board 46 can be provided in contact with or immediately below the stage 41.

The number of coils 51 to 53 provided for the board 46 is not limited to three. The number of coils may be two, or four or more.

Figure 6:
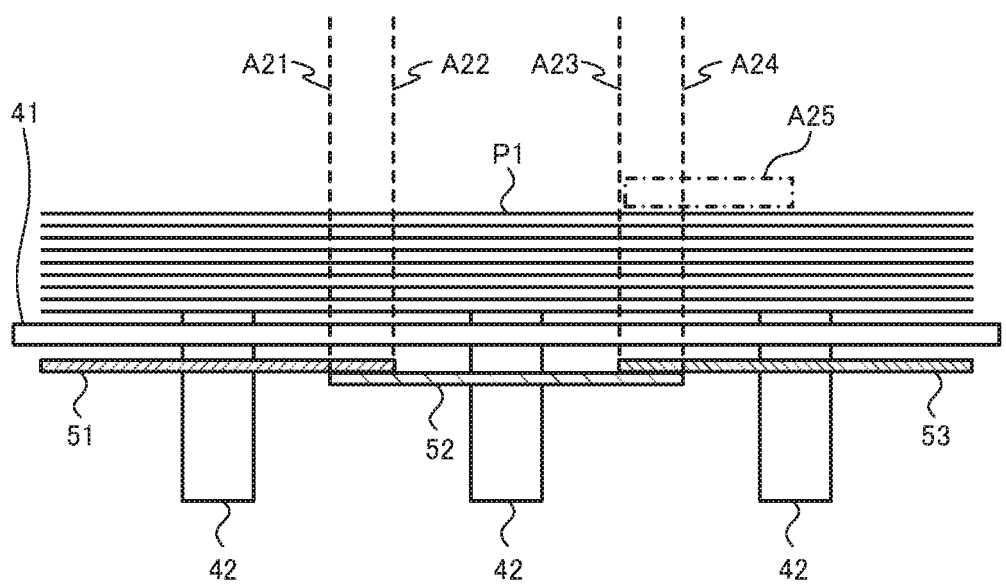
FIG. 6 is a diagram illustrating the feeding section illustrated in FIG. 2 viewed from a direction indicated by an arrow A11.

FIG. 6 is a diagram illustrating the feeding section 40 illustrated in FIG. 2 viewed from a direction indicated by an arrow A11. FIG. 6 illustrates the stage 41 and the kicker rollers 42 illustrated in FIG. 2. FIG. 6 also illustrates the coils 51 to 53 illustrated in FIG. 4.

As illustrated in FIG. 6, the surfaces of the coils 51 to 53 are parallel to the surface of the stage 41. In addition, the coils 51 to 53 are arranged (substantially) equidistantly from the space in which the banknotes P1 are stored. The space is defined by the feeding section 40, and the banknotes P1 that have been taken in are stacked in the space. In addition, the coils 51 to 53 are arranged substantially equidistantly from the surface of the stage 41 on which the banknotes P1 are stacked. For example, a distance between the coil 51 and the bottom one of the banknotes P1 is the same as a distance between the coil 52 and the bottom one of the banknotes P1. The distance between the coil 52 and the bottom one of the banknotes P1 is the same as a distance between the coil 53 and the bottom one of the banknotes P1.

Although the coils 51 to 53 illustrated in FIG. 6 are drawn thickly for the purpose of distinction, the actual coils 51 to 53 formed on the surface of the board 46 or in a layer in the board 46 are extremely thin. For example, the coils 51 to 53 may be formed as wiring patterns on the board 46. In this case, the board 46, on which the coils 51 to 53 are formed, is parallel to the surface of the stage 41, on which the banknotes P1 are stacked. Alternatively, the board 46, on which the coils 51 to 53 are formed, is parallel to the banknotes P1 stacked on the stage 41.

Figure 7:
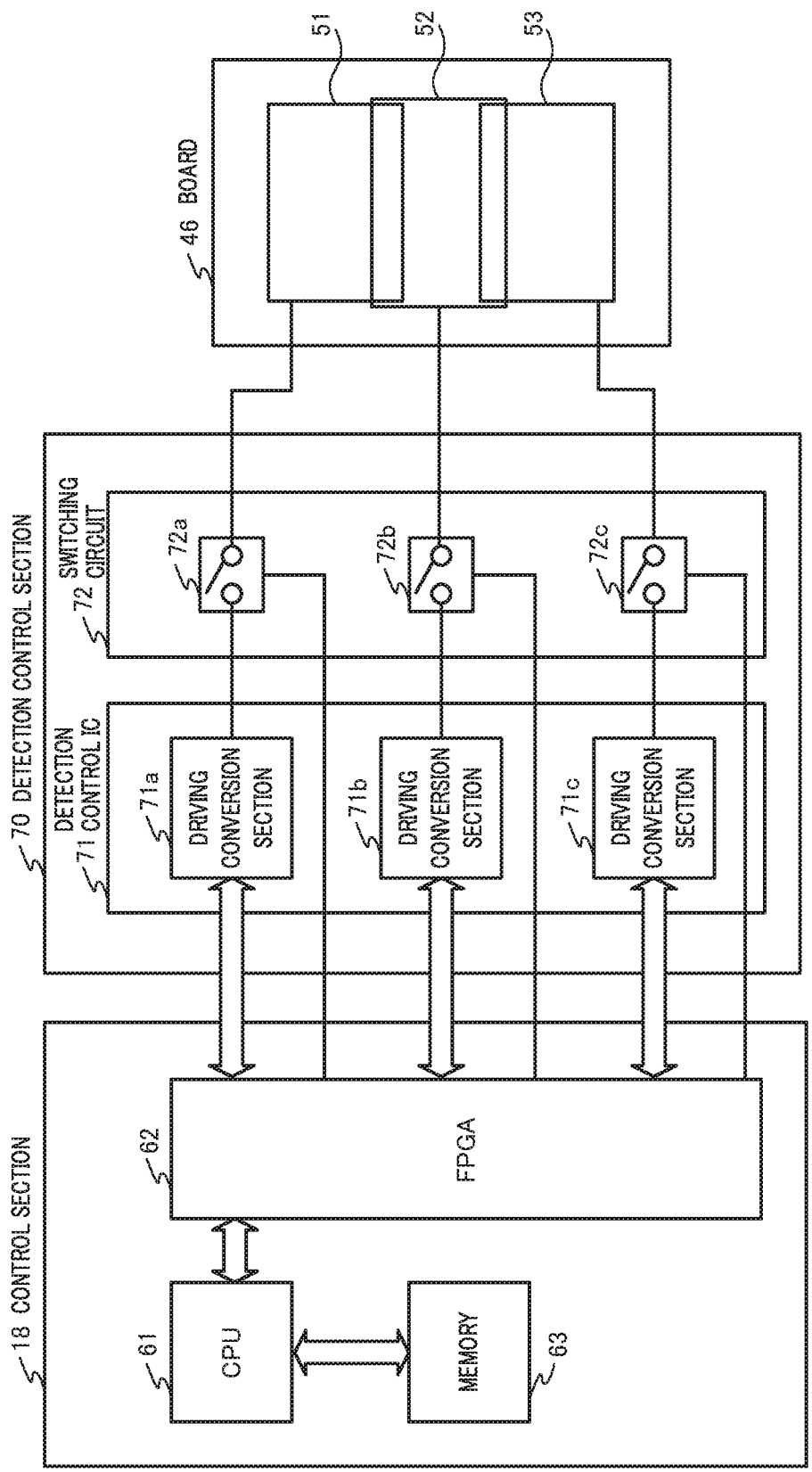
FIG. 7 is a diagram illustrating an example of the configuration of a foreign object detection control system.

FIG. 7 is a diagram illustrating an example of the configuration of a foreign object detection control system. FIG. 7 illustrates the control section 18 illustrated in FIG. 1 and the board 46 illustrated in FIG. 4. The shape of the board 46 illustrated in FIG. 7 is partly different from that of the board 46 illustrated in FIG. 4. As illustrated in FIG. 7, the foreign object detection control system comprises the control section 18, a detection control section 70, and the board 46.

The control section 18 comprises a CPU 61, a field-programmable gate array (FPGA) 62, and a memory 63. The CPU 61 controls the entirety of the sheet processing apparatus 1. The CPU 61 determines whether there is a foreign object in the feeding section 40 (entry of a foreign object) on the basis of signals (data) output from the detection control section 70.

The FPGA 62 controls communication of data between the CPU 61 and the detection control section 70. The FPGA 62 may perform part of the control supposed to be performed by the CPU 61 on the board 46. For example, the FPGA 62 may turn on and off a switching circuit 72 instead of the CPU 61. The memory 63 stores a program for the CPU 61 to operate. The memory 63 also stores data used by the CPU 61 to perform processing and control the other components.

The detection control section 70 comprises a detection control integrated circuit (IC) 71 and the switching circuit 72. The detection control IC 71 comprises driving conversion sections 71a to 71c. The driving conversion sections 71a to 71c output, to the switching circuit 72, currents or voltages for energizing the coils 51 to 53, respectively, in accordance with control (instruction) performed by the CPU 61.

The currents or the voltages for energizing the coils 51 to 53 are alternating currents or voltages. For example, the currents or the voltages for energizing the coils 51 to 53 are sine-wave currents or voltages. Amplitudes and frequencies of the currents or the voltages for energizing the coils 51 to 53 are (substantially) the same. As described with reference to FIG. 5, the number of turns is the same between the coils 51 to 53, and magnitudes of the magnetic fields generated by the coils 51 to 53 are the same.

The driving conversion sections 71a to 71c monitor the currents flowing to the terminals (e.g., the terminals 51a and 51b illustrated in FIG. 5) of the coils 51 to 53 or the voltages between the terminals of the coils 51 to 53, respectively. The driving conversion sections 71a to 71c output amplitudes (or absolute values of amplitudes) of the currents or the voltages monitored thereby to the CPU 61 through the FPGA 62. For example, the driving conversion sections 71a to 71c convert analog values of the currents or the voltages monitored thereby into digital values and output the digital values to the CPU 61 through the FPGA 62. The currents or the voltages for energizing the coils 51 to 53 will also be referred to as "energizing signals" hereinafter. The currents flowing to the terminals of the coils 51 to 53 or the voltages between the terminals of the coils 51 to 53 will also be referred to as "reception signals" hereinafter.

The switching circuit 72 comprises switches 72a to 72c. The switches 72a to 72c turn on and off connections between the driving conversion sections 71a to 71c and the coils 51 to 53, respectively, in accordance with control performed by the CPU 61 through the FPGA 62. When the switches 72a to 72c turn on, for example, the driving conversion sections 71a to 71c and the coils 51 to 53 are connected to each other.

When the switches 72a to 72c turn off, the connections between the driving conversion sections 71a to 71c and the coils 51 to 53 are disconnected from each other.

The energizing signals output from the driving conversion sections 71a to 71c are input to the coils 51 to 53, respectively. The coils 51 to 53 generate magnetic fields from the input energizing signals. If there is a foreign object, such as a piece of metal, near the coils 51 to 53 and the magnetic fields of the coils 51 to 53 are affected, amplitudes of reception signals change from those when there is no foreign object near the coils 51 to 53.

As described above, the driving conversion sections 71a to 71c monitor reception signals of the coils 51 to 53 and output amplitudes of the reception signals to the CPU 61 through the FPGA 62. The CPU 61 detects entry of a foreign object into the feeding section 40 on the basis of the amplitudes of the reception signals. The reception signals can be regarded as foreign object detection signals output from the coils 51 to 53.

Figure 8:
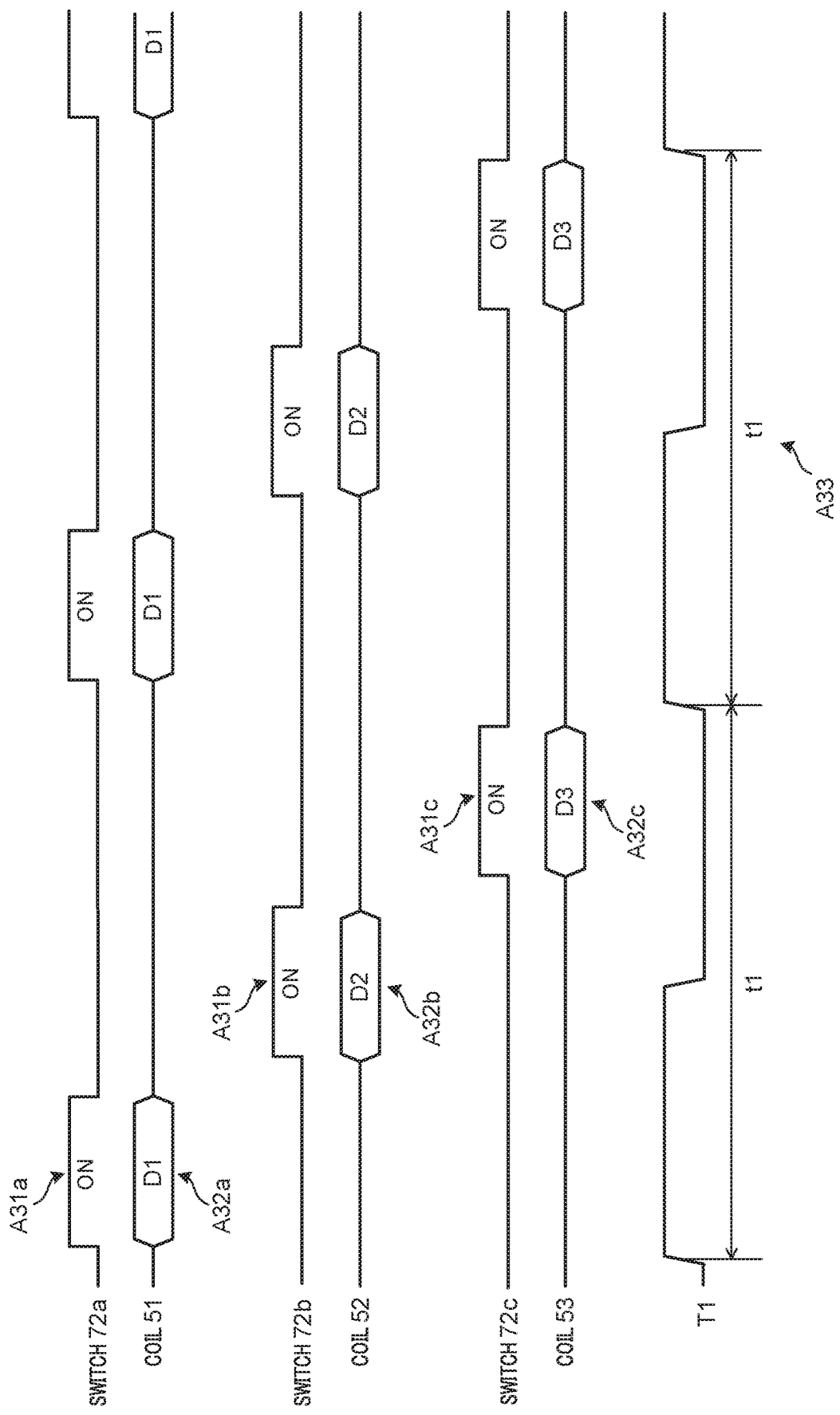
FIG. 8 is a timing chart illustrating an example of the operation of the foreign object detection control system illustrated in FIG. 7.

FIG. 8 is a timing chart illustrating an example of the operation of the foreign object detection control system illustrated in FIG. 7. T1 in FIG. 8 indicates timings at which the banknotes P1 stacked on the stage 41 are fed into the first branch path 15b one by one. Time taken for a banknote to be fed into the first branch path 15b is denoted by t1 as indicated in FIG. 8. In other words, one of the banknotes P1 stacked on the stage 41 is fed into the first branch path 15b in each period t1.

ON for the switches 72a to 72c in FIG. 8 denotes timings at which the switches 72a to 72c turn on. The switches 72a to 72c are turned off during periods other than ones indicated by ON in FIG. 8.

D1 to D3 for the coils 51 to 53 in FIG. 8 denote timings at which energizing signals are input to the coils 51 to 53 and the driving conversion sections 71a to 71c output amplitudes of reception signals to the CPU 61, respectively.

After the sheet processing apparatus 1 is turned on, for example, the CPU 61 controls the driving conversion sections 71a to 71c and outputs energizing signals from the driving conversion sections 71a to 71c. As a result, the energizing signals are input to the switches 72a to 72c.

After causing the driving conversion sections 71a to 71c to output the energizing signals, the CPU 61 turns on and off the switches 72a to 72c one by one within the period t1. As indicated by an arrow A31a in FIG. 8, for example, the CPU 61 keeps the switch 72a turned on for a certain period of time and then turns off the switch 72a. As indicated by an arrow A31b, after turning off the switch 72a, the CPU 61 keeps the switch 72b turned on for a certain period of time and then turns off the switch 72b. As indicated by an arrow A31c, after turning off the switch 72b, the CPU 61 keeps the switch 72c turned on for a certain period of time and then turns off the switch 72c. As a result, the energizing signals are sequentially input to the coils 51 to 53 within the period t1. The coils 51 to 53 in turn sequentially generate magnetic fields within the period t1. As described above, the process for sequentially turning on and off the switches 72a to 72c may be performed by the FPGA 62, instead.

The driving conversion sections 71a to 71c monitor reception signals of the coils 51 to 53 while the switches 72a to 72c remain turned on, respectively, and then output amplitudes of the reception signals to the CPU 61 through the FPGA 62. For example, the driving conversion section 71a monitors a reception signal of the coil 51 and outputs an amplitude of the reception signal to the CPU 61 through the FPGA 62 in a period D1 indicated by an arrow A32a in FIG. 8. The driving conversion section 71b monitors a reception signal of the coil 52 and outputs an amplitude of the reception signal to the CPU 61 through the FPGA 62 in a period D2 indicated by an arrow A32b in FIG. 8. The driving conversion section 71c monitors a reception signal of the coil 53 and outputs an amplitude of the reception signal to the CPU 61 through the FPGA 62 in a period D3 indicated by an arrow A32c in FIG. 8.

Upon receiving the amplitudes of the reception signals from the driving conversion sections 71a to 71c, the CPU 61 determines whether a foreign object has entered the feeding section 40 on the basis of the received amplitudes of the reception signals. For example, when the CPU 61 has obtained the amplitudes of the reception signals of the coils 51 to 53 in the periods D1 to D3 indicated by the arrows A31a to A31c in FIG. 8, the CPU 61 determines, in a period t1 indicated by an arrow A33, whether a foreign object has entered the feeding section 40 on the basis of the amplitudes of the reception signals received in the periods D1 to D3 indicated by the arrows A31a to A31c in FIG. 8. That is, after receiving amplitudes of reception signals of all the coils 51 to 53, the CPU 61 determines, in a period t1 in which a next banknote is to be fed, whether a foreign object has entered the feeding section 40.

Now, a relationship between a position of a foreign object and the amount of change in amplitudes of reception signals of the coils 51 to 53 will be described with reference to FIG. 6. The amount of change in an amplitude of a reception signal caused by a foreign object, such as a piece of metal, right above a wire (lead wire) of one of the coils 51 to 53 is smaller than the amount of change in an amplitude of a reception signal caused by a foreign object within an area surrounded by the wire of one of the coils 51 to 53.

For example, a broken line A21 in FIG. 6 indicates a position right above the wire of the coil 52. If there is a foreign object, such as a piece of metal, on the line A21, the amount of change in an amplitude of a reception signal of the coil 52 is usually small.

The coils 51 and 52, however, partly overlap with each other as described above. A foreign object on the line A21, therefore, is located not only right above the wire of the coil 52 but also within an area surrounded by the wire of the coil 51. The amount of change in an amplitude of a reception signal caused by a foreign object on the line A21 is large in the coil 51.

For example, a broken line A22 in FIG. 6 indicates a position right above the wire of the coil 51. If there is a foreign object, such as a piece of metal, on the line A22, the amount of change in an amplitude of a reception signal of the coil 51 is usually small.

The coils 51 and 52, however, partly overlap with each other as described above. A foreign object on the line A22, therefore, is located not only right above the wire of the coil 51 but also within an area surrounded by the wire of the coil 52. The amount of change in an amplitude of a reception signal caused by a foreign object on the line A22 is large in the coil 52.

Similarly, a broken line A23 in FIG. 6 indicates a position right above the wire of the coil 53. The amount of change in an amplitude of a reception signal caused by a foreign object on the line A23 is large in the coil 52. A broken line A24 in FIG. 6 indicates a position right above the wire of the coil 52. The amount of change in an amplitude of a reception signal caused by a foreign object on the line A24 is large in the coil 53.

The coils 51 to 53 are thus provided for the board 46 such that adjacent ones of the coils 51 to 53 partly overlap with each other. The CPU 61 controls the switches 72a to 72c in such a way as to sequentially energize the coils 51 to 53. As a result, even if there is a foreign object right above the wire of one of the coils 51 to 53, another of the coils 51 to 53 outputs a reception signal whose amplitude has been significantly changed.

An example of operations performed by the CPU 61 in the determination as to a foreign object will be described. For example, the operations performed by the CPU 61 comprise an operation for obtaining reference values and an operation for making a determination as to a foreign object using the obtained reference values.

1. Obtain Reference Values

The CPU 61 obtains amplitudes (reference values) of reception signals of the coils 51 to 53 at a time when there are no banknotes or foreign objects (clean state) in the feeding section 40. For example, the CPU 61 obtains, with the feeding section 40 in the clear state, the reference values for the coils 51 to 53 after the sheet processing apparatus 1 is turned on.

After the sheet processing apparatus 1 is turned on, for example, the CPU 61 outputs energizing signals to the coils 51 to 53 as indicated by D1 to D3 in FIG. 8. The CPU 61 receives, through the FPGA 62, amplitudes (reference values) of reception signals output from the driving conversion sections 71a to 71c and stores the reference values in the memory 63.

Figure 9:
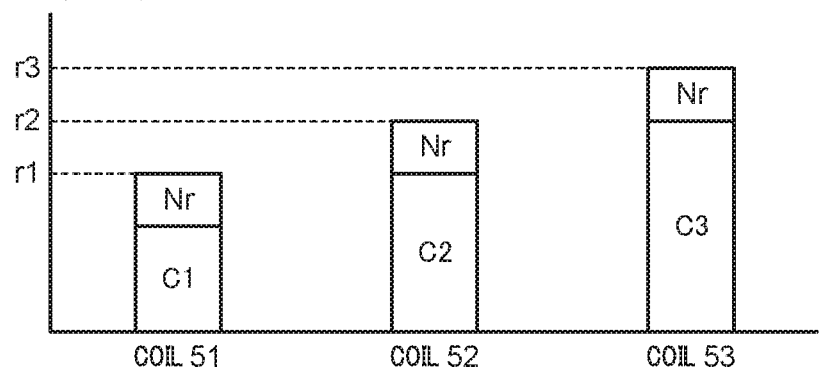
FIG. 9 is a diagram illustrating an example of reference values.

FIG. 9 is a diagram illustrating an example of the reference values. In FIG. 9, r1, r2, and r3 denote the reference values for the coils 51, 52, and 53, respectively. That is, r1 to r3 in FIG. 9 denote amplitudes of reception signals of the coils 51 to 53 at a time when there are no banknotes or foreign objects in the feeding section 40. The reference values r1 to r3 are stored in the memory 63.

In order to facilitate understanding of the present disclosure, it is assumed that the reference values (the amplitudes of the reception signals) output from the coils 51 to 53 comprise signal components that depend on a surrounding environment and signal components that do not depend on the surrounding environment. C1 to C3 in FIG. 9, for example, denote signal components of the coils 51 to 53, respectively, that do not depend on the surrounding environment. Nr in FIG. 9 denotes signal components that depend on the surrounding environment of the coils 51 to 53. Nr varies depending on the surrounding environment of the coils 51 to 53.

Here, the coils 51 to 53 are configured such that the signal components of the coils 51 to 53 that depend on the surrounding environment become substantially the same. The signal components that depend on the surrounding environment become substantially the same by, for example, using the same material, the same shape, and the number of turns for the coils 51 to 53.

Alternatively, the coils 51 to 53 may be coils whose signal components that depend on the surrounding environment are substantially the same with at least one of the material, the shape, and the number of turns different between the coils 51 to 53. The surrounding environment is, for example, surrounding temperature of the coils 51 to 53.

The coils 51 to 53 may be coils at least whose signal components that depend on temperature are substantially the same, instead. A case where temperature, which is an example of the surrounding environment, affects the coils 51 to 53 will be described hereinafter.

2. Determine Whether Foreign Object has Entered Feeding Section 40

The CPU 61 determines whether a foreign object has entered the feeding section 40 in, for example, a deposit process using obtained reference values.

There are three operations performed by the CPU 61 to make the determination. The operations performed by the CPU 61 comprise, for example, a first operation for obtaining amplitudes of reception signals of the coils 51 to 53, a second operation for subtracting reference values obtained in advance from the amplitudes of the reception signals obtained in the first operation, and a third operation for determining whether a foreign object has entered the feeding section 40 on the basis of results of the subtraction performed in the second operation.

First Operation (Obtain Amplitudes of Reception Signals)

As indicated by D1 to D3 in FIG. 8, for example, the CPU 61 outputs energizing signals to the coils 51 to 53 once in each period t1. In other words, the coils 51 to 53 are sequentially energized once while a banknote P1 is being fed. The CPU 61 then receives (obtains) amplitudes of reception signals of the coils 51 to 53 at the timings indicated by D1 to D3 in FIG. 8.

Figure 10:
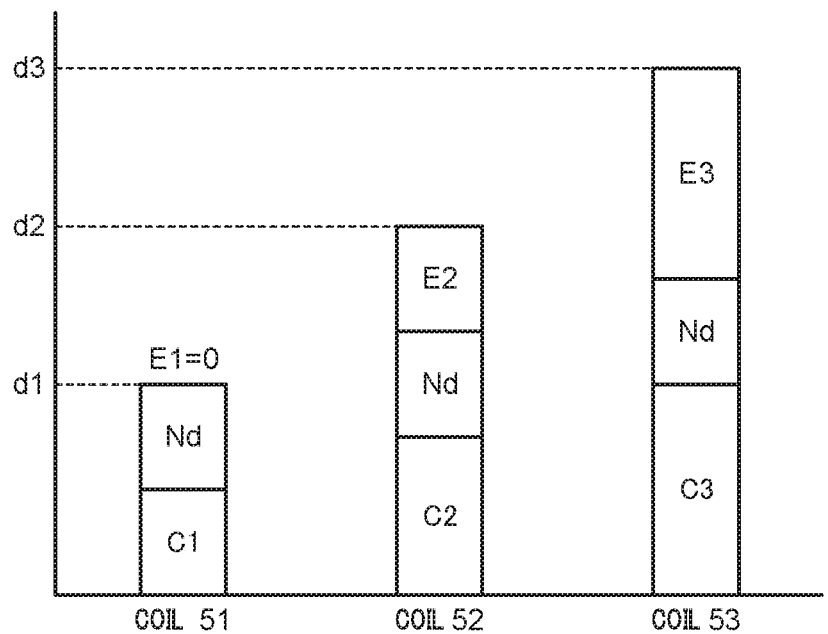
FIG. 10 is a diagram illustrating an example of amplitudes of reception signals obtained by a central processing unit (CPU)

FIG. 10 is a diagram illustrating an example of the amplitudes of the reception signals obtained by the CPU 61. It is assumed in FIG. 10 that a foreign object has entered an area A25 indicated by a dash-dot line in FIG. 6.

In FIG. 10, d1 to d3 denote the amplitudes of the reception signals of the coils 51 to 53, respectively.

In FIG. 10, C1 to C3 denote signal components of the coils 51 to 53, respectively, that do not depend on temperature. C1 to C3 in FIG. 10 are the same as those in FIG. 9.

In FIG. 10, Nd denotes signal components of the coils 51 to 53 that depend on temperature. A surrounding temperature when the CPU 61 has obtained the amplitudes d1 to d3 of the reception signals is different from a surrounding temperature when the CPU 61 has obtained the reference values r1 to r3 illustrated in FIG. 9 are different from each other, and therefore Nd≠Nr.

In FIG. 10, E1 to E3 denote signal components of the coils 51 to 53, respectively, affected by the foreign object. As indicated by the area A25 illustrated in FIG. 6, the foreign object is distant from the coil 51, and therefore E1=0. The foreign object overlaps the coils 52 and 53 and is also located inside the wire of the coil 53, and therefore E2<E3. It is assumed in FIG. 10, too, that the signal components of the coils 51 to 53 comprise signal components that do not depend on temperature, signal components that depend on temperature, and signal components affected by the foreign object.

Second Operation (Subtract Reference Values)

Upon obtaining the amplitudes of the reception signals of the coils 51 to 53, the CPU 61 subtracts the reference values for the coils 51 to 53 from the obtained amplitudes of the corresponding reception signals of the coils 51 to 53.

For example, the CPU 61 subtracts the reference values for the coils 51 to 53 from the amplitudes of the reception signals of the coils 51 to 53, respectively.

In the case of the reference values illustrated in FIG. 9 and the amplitudes of the reception signals illustrated in FIG. 10, results (differential values) Δ1 to Δ3 of the subtraction of the reference values for the coils 51 to 53 from the corresponding amplitudes of the reception signals are as represented by the following equations 1 to 3.

$$\Delta 1 = d1 - r1 = Nd + E1 - Nr \quad \text{(equation 1)}$$

$$\Delta 2 = d2 - r2 = Nd + E2 - Nr \quad \text{(equation 2)}$$

$$\Delta 3 = d3 - r3 = Nd + E3 - Nr \quad \text{(equation 3)}$$

Third Operation (Determine Whether Foreign Object has Entered Feeding Section 40)

Upon obtaining the results (hereinafter also referred to as "first differential values") of the subtraction of the reference values for the coils 51 to 53 from the amplitudes of the corresponding reception signals, the CPU 61 calculates absolute values of results (hereinafter also referred to as "second differential values") of subtraction of the obtained first differential values from each other. The CPU 61 then determines, on the basis of the calculated absolute values of the second differential values, whether a foreign object has entered the feeding section 40. If at least one of the absolute values of the second differential values exceeds a certain threshold, for example, the CPU 61 determines that a foreign object has entered the feeding section 40.

In the case of the results (first differential values) represented by equations 1 to 3, the absolute values of the differential values (second differential values) between the first differential values are as represented by the following equations 4 to 6.

$$\Delta 12 = |\Delta 1 - \Delta 2| = |E1 - E2| \qquad \text{(equation 4)}$$

$$\Delta 23 = |\Delta 2 - \Delta 3| = |E2 - E3| \qquad \text{(equation 5)}$$

$$\Delta 31 = |\Delta 3 - \Delta 1| = |E3 - E1| \qquad \text{(equation 6)}$$

If at least one of the absolute values of the second differential values represented by equations 4 to 6 exceeds a certain threshold, the CPU 61 determines that a foreign object has entered the feeding section 40.

Figure 11:
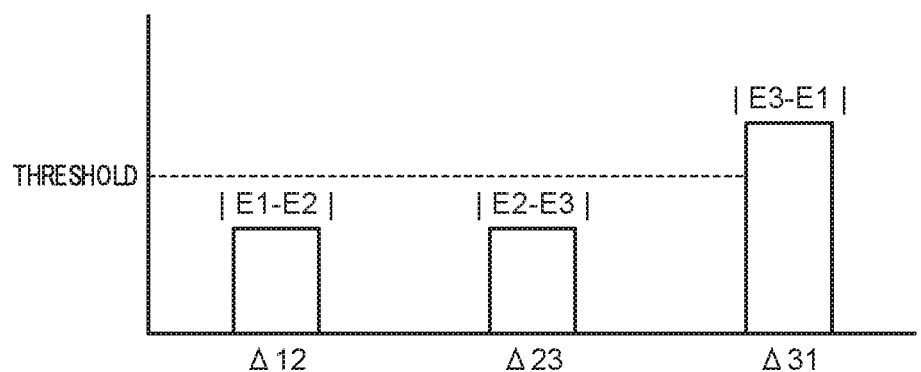
FIG. 11 is a diagram illustrating an example of a determination made by the CPU as to whether a foreign object has entered the feeding section.

FIG. 11 is a diagram illustrating an example of the determination made by the CPU 61 as to whether a foreign object has entered the feeding section 40. FIG. 11 illustrates the absolute values of the second differential values represented by equations 4 to 6. If at least one of the absolute values of the second differential values exceeds the certain threshold, the CPU 61 determines that a foreign object has entered the feeding section 40. In the example illustrated in FIG. 11, $\Delta 31$ exceeds the threshold. The CPU 61 determines that a foreign object has entered the feeding section 40.

In equations 4 to 6, the signal components (Nr and Nd) that depend on temperature are canceled. The CPU 61 can therefore accurately determine whether a foreign object has entered the feeding section 40 regardless of an effect of a change in the surrounding temperature of the coils 51 to 53.

If a foreign object is smaller than the area of the coil 51, an effect of the foreign object upon at least one of the coils 51 to 53 becomes (substantially) zero. At least one of $\Delta 12$, $\Delta 23$, and $\Delta 31$, therefore, becomes equal to a change in the amplitude of the reception signal caused by the foreign object.

Figure 12:
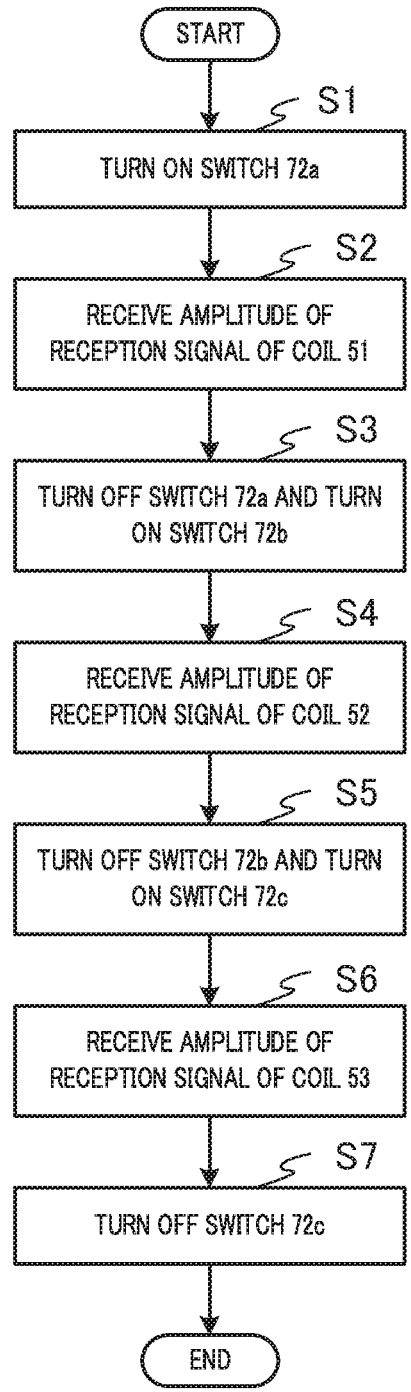
FIG. 12 is a flowchart illustrating an example of a process performed by the CPU to obtain amplitudes of reception signals.

FIG. 12 is a flowchart illustrating an example of a process performed by the CPU 61 to obtain amplitudes of reception signals. The CPU 61 performs the process illustrated in the flowchart of FIG. 12, for example, each time one of the banknotes P1 stacked on the stage 41 is fed into the first branch path 15b (in each period t1). It is assumed in the following description that the CPU 61 has obtained the reference values and stored the reference values in the memory 63. It is also assumed that the CPU 61 controls the driving conversion sections 71a to 71c in such a way as to output energizing signals to the switches 72a to 72c, respectively.

The CPU 61 turns on the switch 72a (step S1). As a result, the energizing signal output from the driving conversion section 71a is input to the coil 51. The driving conversion section 71a outputs an amplitude of a reception signal of the coil 51 to the CPU 61 through the FPGA 62.

The CPU 61 receives the amplitude of the reception signal of the coil 51 from the driving conversion section 71a through the FPGA 62 (step S2). The CPU 61 stores the received amplitude of the reception signal of the coil 51 in, for example, the memory 63.

The CPU 61 turns off the switch 72a and turns on the switch 72b (step S3). As a result, the energizing signal output from the driving conversion section 71b is input to the coil 52. The driving conversion section 71b outputs an amplitude of a reception signal of the coil 52 to the CPU 61 through the FPGA 62.

The CPU 61 receives the amplitude of the reception signal of the coil 52 from the driving conversion section 71b through the FPGA 62 (step S4). The CPU 61 stores the received amplitude of the reception signal of the coil 52 in, for example, the memory 63.

The CPU 61 turns off the switch 72b and turns on the switch 72c (step S5). As a result, the energizing signal output from the driving conversion section 71c is input to the coil 53. The driving conversion section 71c outputs an amplitude of a reception signal of the coil 53 to the CPU 61 through the FPGA 62.

The CPU 61 receives the amplitude of the reception signal of the coil 53 from the driving conversion section 71c through the FPGA 62 (step S6). The CPU 61 stores the received amplitude of the reception signal of the coil 53 in, for example, the memory 63.

The CPU 61 turns off the switch 72c (step S7), and ends the process illustrated in the flowchart.

After receiving the amplitudes of the reception signals of all the coils 51 to 53 in the period t1 (after storing the amplitudes of the reception signals in the memory 63), the CPU 61 determines, in the next period t1 on the basis of the amplitudes of the reception signals stored in the memory 63, whether a foreign object has entered the feeding section 40.

Figure 13:
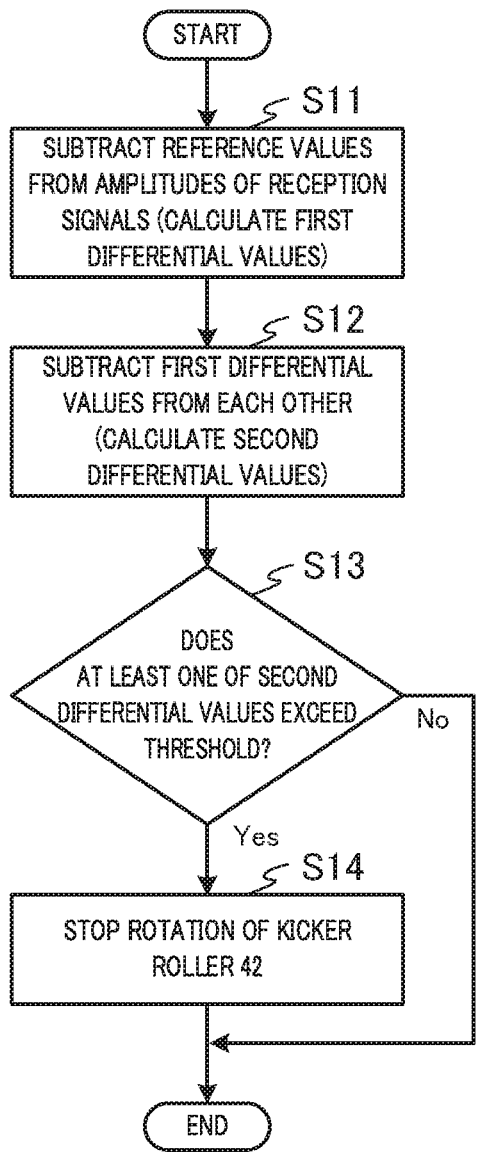
FIG. 13 is a flowchart illustrating an example of a process performed by the CPU to determine whether a foreign object has entered the feeding section.

FIG. 13 is a flowchart illustrating an example of a process performed by the CPU 61 to determine whether a foreign object has entered the feeding section 40. The CPU 61 performs the process illustrated in the flowchart of FIG. 13, for example, each time one of the banknotes P1 stacked on the stage 41 is fed into the first branch path 15b (in each period t1).

The CPU 61 obtains first differential values by subtracting reference values stored in the memory 63 from amplitudes of reception signals stored in the memory 63 (step S11). For example, the CPU 61 subtracts the reference values for the coils 51 to 53 stored in the memory 63 from the amplitudes of the reception signals of the coils 51 to 53, respectively, stored in the memory 63 (differential values $\Delta 1$ to $\Delta 3$ of the coils 51 to 53 are obtained as a result of the subtraction).

The CPU 61 calculates second differential values (absolute values) by subtracting the first differential values from each other (step S12). For example, the CPU 61 obtains an absolute value $\Delta 12$ of a result of subtraction of the differential value $\Delta 2$ of the coil 52 from the differential value $\Delta 1$ of the coil 51. The CPU 61 obtains an absolute value $\Delta 23$ of a result of subtraction of the differential value $\Delta 3$ of the coil 53 from the differential value $\Delta 2$ of the coil 52. The CPU 61 obtains an absolute value $\Delta 31$ of a result of subtraction of the differential value $\Delta 1$ of the coil 51 from the differential value $\Delta 3$ of the coil 53.

The CPU 61 determines whether at least one of the second differential values exceeds a threshold (step S13). For example, the CPU 61 determines whether at least one of $\Delta 12$, $\Delta 23$, and $\Delta 31$ exceeds the threshold. If determining that none of Δ12, Δ23, and Δ31 exceeds the threshold (NO in S13), the CPU 61 ends the process illustrated in the flowchart. If determining that at least one of Δ12, Δ23, and Δ31 exceeds the threshold (YES in S13), on the other hand, the CPU 61 stops rotation of the kicker rollers 42 (step S14). As a result, the foreign object is prevented from entering the first branch path 15b.

Before starting a deposit process, for example, the CPU 61 may perform the processes illustrated in the flowcharts of FIGS. 12 and 13 at least once. That is, before the banknotes P1 taken in the inlet section 12 are fed into the first branch path 15b, the CPU 61 may perform the processes illustrated in the flowcharts of FIGS. 12 and 13 at least once. As a result, the foreign object is prevented from entering the first branch path 15b.

In addition, the CPU 61 may keep performing the processes illustrated in the processes of FIGS. 12 and 13 even while the banknotes P1 are being fed into the first branch path 15b. In this case, even if a foreign object enters the feeding section 40 while the banknotes P1 are being fed into the first branch path 15b, the foreign object is prevented from entering the first branch path 15b.

As described above, the sheet processing apparatus 1 comprises the coils 51 to 53 that are provided in the feeding section 40, which feeds banknotes that have been taken in into a transport path, and that generate magnetic fields and the CPU 61 that determines whether a foreign object has entered the feeding section 40 on the basis of differential values between amplitudes of reception signals output from the coils 51 to 53. The coils 51 to 53 are foreign object detection coils that output different signals depending on whether there is a foreign object nearby. As a result, the sheet processing apparatus 1 improves the accuracy of detecting entry of a foreign object while suppressing an increase in the number of parts. For example, the sheet processing apparatus 1 can accurately determine whether a foreign object has entered the feeding section 40 regardless of an effect of a change in surrounding temperature without a temperature sensor, a reference coil, or the like.

The sheet processing apparatus 1 is just an example of an apparatus on which the present disclosure is implemented. The present disclosure can also be widely implemented on sheet processing apparatuses comprising the feeding section 40 that feeds banknotes that have been taken in into a transport path. A feeding section on which the present disclosure is implemented is not limited to the above-described feeding section 40, and any feeding section comprising a function of feeding banknotes into a transport path one by one may be used.

(Modification 1)

Although the CPU 61 obtains reference values after the sheet processing apparatus 1 is turned on in the above description, the CPU 61 may obtain reference values at another timing, instead. For example, the CPU 61 may obtain reference values at a timing specified by a user. The reference values may be values stored in the memory 63 in advance, instead.

(Modification 2)

Although the driving conversion sections 71a to 71c output amplitudes of reception signals of the coils 51 to 53 to the CPU 61 through the FPGA 62 in the above description, the driving conversion sections 71a to 71c may output frequencies of reception signals of the coils 51 to 53 to the CPU 61 through the FPGA 62, instead.

In this case, the CPU 61 stores frequencies of reception signals of the coils 51 to 53 in the memory 63 as reference values. The CPU 61 subtracts the reference values for frequencies of the coils 51 to 53 from the frequencies of the reception signals of the coils 51 to 53 output from the driving conversion sections 71a to 71c (calculates first differential values). The CPU 61 then calculates differential values (second differential values) between the first differential values and determines whether a foreign object has entered the feeding section 40 on the basis of the calculated second differential values.

Alternatively, the driving conversion sections 71a to 71c may output amplitudes and frequencies of reception signals of the coils 51 to 53 to the CPU 61 through the FPGA 62.

In this case, the CPU 61 stores amplitudes and frequencies of reception signals of the coils 51 to 53 in the memory 63 as reference values. The CPU 61 subtracts the reference values for amplitudes of the coils 51 to 53 from the amplitudes of the reception signals of the coils 51 to 53 output from the driving conversion sections 71a to 71c (calculates first amplitude differential values). The CPU 61 also subtracts the reference values for frequencies of the coils 51 to 53 from the frequencies of the reception signals of the coils 51 to 53 output from the driving conversion sections 71a to 71c (calculates first frequency differential values).

The CPU 61 then calculates differential values (second amplitude differential values) between the first amplitude differential values. The CPU 61 also calculates differential values (second frequency differential values) between the first frequency differential values. If at least one of the second amplitude differential values exceeds a threshold and at least one of the second frequency differential values exceeds a threshold, the CPU 61 determines that a foreign object has entered the feeding section 40.

(Modification 3)

Although the board 46 is provided under the stage 41 in the above description, a position at which the board 46 is provided is not limited to this. For example, the board 46 may be provided on a back surface (a position indicated by a broken line Δ41 in FIG. 2) of the banknote guides 47 illustrated in FIG. 2, instead.

In addition, although banknotes are set flat in the sheet processing apparatus 1 in the above description, the present disclosure can also be implemented on sheet processing apparatuses in which banknotes are set upright.

Figure 14:
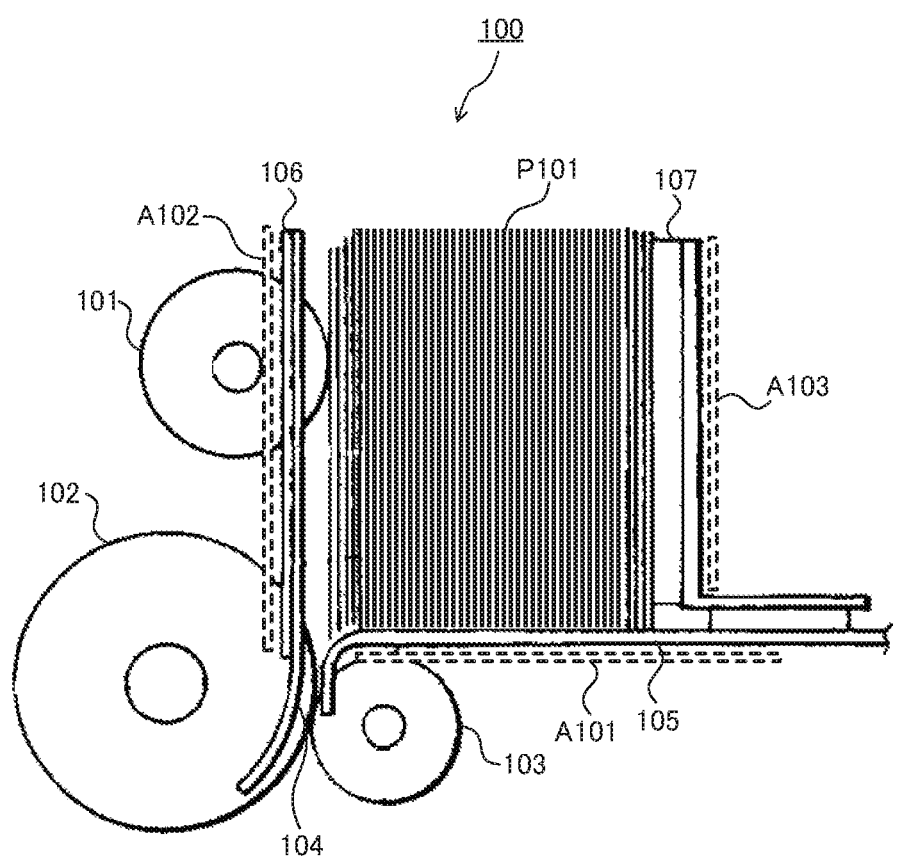
FIG. 14 is a diagram illustrating an example of the configuration of a sheet processing apparatus in which banknotes are set upright.

FIG. 14 is a diagram illustrating an example of the configuration of a sheet processing apparatus 100 in which banknotes are set upright. As illustrated in FIG. 14, the sheet processing apparatus 100 comprises kicker rollers 101, feed rollers 102, gate rollers 103, a transport path 104, a stage 105, a fixed guide 106, and a movable guide 107. FIG. 14 illustrates banknotes P101 set upright. Pushing members (not illustrated), such as springs, of the movable guide 107 push the upright banknotes P101 toward the fixed guide 106.

The board 46 (not illustrated) may be provided under the stage 105 (a position A101 indicated by a broken line in FIG. 14). Alternatively, the board 46 may be provided on a back side (a position A102 indicated by a broken line in FIG. 14) of the fixed guide 106. Alternatively, the board 46 may be provided on a back side (a position A103 indicated by a broken line in FIG. 14) of the movable guide 107. The sheet processing apparatus 100 also comprises the control section 18 illustrated in FIG. 7 and the detection control section 70 (not illustrated).

The foreign object detection control system can thus be used for the sheet processing apparatus 100 in which banknotes are set upright.

(Modification 4)

The configuration of the foreign object detection control system is not limited to the example illustrated in FIG. 7.

The FPGA 62, the detection control IC 71, and the switching circuit 72 may be achieved by a single chip. Alternatively, the CPU 61 may comprise the functions of the FPGA 62, the detection control IC 71, and the switching circuit 72. The detection control section 70 may be mounted on the board 46, instead.

(Modification 5) The driving conversion sections 71*a* to 71*c* may output energizing signals such that adjacent ones of the coils 51 to 53 generate opposite magnetic fields. For example, the driving conversion sections 71*a* to 71*c* may output energizing signals such that the coil 51 generates a magnetic field directed to a nearer side of the page of FIG. 4, the coil 52 generates a magnetic field directed to a deeper side of the page of FIG. 4, and the coil 53 generates a magnetic field directed to the nearer side of the page of FIG. 4.

As a result, when the coils 51 to 53 are sequentially energized, the coils 51 to 53 are hardly affected by magnetic fields of coils that have been previously energized. In addition, when winding directions of adjacent ones of the coils 51 to 53 are different from each other, the coils 51 to 53 generate opposite magnetic fields even if energizing signals of the same phase are input to the adjacent ones of the coils 51 to 53.

(Modification 6)

The operation for calculating the first differential values may be omitted, and the second differential values may be results of subtraction of amplitudes of reception signals of the coils 51 to 53 from each other, instead. In this case, absolute values of the second differential values are as represented by the following equations 7 to 9.

$$\Delta 12 = |d1-d2| = |C1-C2+(E1-E2)| \tag{equation 7}$$

$$\Delta 23 = |d2-d3| = |C2-C3+(E2-E3)| \tag{equation 8}$$

$$\Delta 31 = |d3-d1| = |C3-C1+(E3-E1)| \tag{equation 9}$$

Here, C1 to C3 are signal components of the coils 51 to 53 that do not depend on temperature and are unique to the coils 51 to 53, respectively. When C1 to C3 have been measured in advance, C1-C2, C2-C3, and C3-C1 can be identified.

In the process for determining whether a foreign object has entered the feeding section 40 illustrated in FIG. 11, the threshold for the differential value between the coils 51 and 52 is a value that takes into consideration C1-C2, the threshold for the differential value between the coils 52 and 53 is a value that takes into consideration C2-C3, and the threshold for the differential value between the coils 53 and 51 is a value that takes into consideration C3-C1. The control section 18 can then determine whether a foreign object has entered the feeding section 40 by comparing the thresholds (the thresholds that take into consideration C1-C2, C2-C3, and C3-C1) and the absolute values represented by equations 7 to 9, respectively. Whether a foreign object has entered a feeding section can thus be determined on the basis of differential values between signals output from a plurality of coils.

(Modification 7)

The sheet processing apparatus on which the present disclosure is implemented comprises a plurality of coils that are provided in a feeding section which feeds a sheet that has been taken in into a transport path and that generate magnetic fields and a control section that determines, on a basis of differential values between signals output from the plurality of coils, whether a foreign object has entered the feeding section. The control section causes the plurality of coils to sequentially generate the magnetic fields one by one and detects the signals output from the plurality of coils while the coils are generating the magnetic fields.

Although the coils 51 to 53 are energized once in the period t1, in which the feeding section 40 feeds out one of the banknotes P1 in the above embodiment, the present disclosure is not limited to this mode. The coils 51 to 53 may be energized a plurality of times while the feeding section 40 is feeding out one of the banknotes P1.

For example, while the feeding section 40 is feeding out one of the banknotes P1, the control section 18 performs, a plurality of times, a process for sequentially energizing the coils 51 to 53 and detecting signals output from the coils 51 to 53 while the coils 51 to 53 are generating magnetic fields. Alternatively, while the feeding section 40 is feeding out one of the banknotes P1, the control section 18 performs a process for sequentially energizing the coils 51 to 53 a plurality of times and detecting, the plurality of times, signals output from the coils 51 to 53 while the coils 51 to 53 are generating magnetic fields.

The control section 18 determines, using all the signals detected in the process in which the coils 51 to 53 have been energized a plurality of times, whether a foreign object has entered the feeding section 40. For example, the control section 18 determines, using the detected signals, whether a foreign object has entered the feeding section 40. If the number of signals indicating that the control section 18 has determined that a foreign object has entered the feeding section 40 is larger than a certain value, the control section 18 confirms the result of the determination that a foreign object has entered the feeding section 40. Alternatively, in the case of the process in which the coils 51 to 53 are energized a plurality of times, if a certain number of signals consecutively indicate that a foreign object has entered the feeding section 40, the control section 18 may confirm the result of the determination that a foreign object has entered the feeding section 40. In this case, even if the coils 51 to 53 temporarily operate abnormally, the control section 18 can accurately determine whether a foreign object has entered the feeding section 40. When static electricity occurs for an instant, for example, the coils 51 to 53 might output abnormal signals. By also detecting signals before and after the occurrence of static electricity, however, an incorrect result of a determination based only on the abnormal signals can be avoided.

REFERENCE SIGNS LIST

1 sheet processing apparatus
12 inlet section
15*a* loop transport path
15*b* first branch path
18 control section
40 feeding section
41 stage
42 kicker roller
43 feed roller
44 gate roller
45 transport roller
46 board
47 banknote guide
51 to 53 coil
54*a* to 54*c*, 55*a* to 55*f* opening
61 CPU
62 FPGA
71 detection control IC
71*a* to 71*c* driving conversion section 72 switching circuit
72a to 72c switch

The invention claimed is:

1. A sheet processing apparatus, comprising:
a plurality of coils configured to generate magnetic fields, the plurality of coils positioned at an interface of the sheet processing apparatus that is configured to receive a sheet that has been taken in and to feed the sheet into a transport path of the sheet processing apparatus;
a plurality of kicker rollers configured to kick the sheet toward a gate configured to receive the sheet; and
circuitry configured to determine, on a basis of differential values between signals output from the plurality of coils, whether a foreign object has entered the interface, wherein
the plurality of coils are foreign object detection coils configured to output different signals depending on whether there is the foreign object nearby, and
each of the plurality of coils is arranged to surround a corresponding kicker roller of the plurality of kicker rollers such that a portion of each of the plurality of kicker rollers penetrates an opening formed by each of the plurality of coils.

2. The sheet processing apparatus of claim 1, wherein a reference value is set in advance for each of the plurality of coils, and
the circuitry is configured to
calculate first differential values between the signals output from the plurality of coils and the reference values for the plurality of coils and second differential values between the first differential values for the plurality of coils; and
determine, on a basis of the second differential values, whether a foreign object has entered the interface.

3. The sheet processing apparatus of claim 2, wherein the reference values are values of signals output from the plurality of coils when a foreign object has not entered the interface.

4. The sheet processing apparatus of claim 3, wherein the reference values are values measured at a certain timing.

5. The sheet processing apparatus of claim 1, wherein surfaces of the plurality of coils are parallel to a surface of the sheet.

6. The sheet processing apparatus of claim 5, wherein the plurality of coils are arranged in a direction perpendicular to a direction in which the sheet is fed.

7. The sheet processing apparatus of claim 1, wherein the plurality of coils are arranged equidistantly from a space inside the interface in which the sheet is stored.

8. The sheet processing apparatus of claim 1, wherein adjacent ones of the plurality of coils partly overlap.

9. The sheet processing apparatus of claim 1, wherein the plurality of coils sequentially generate the magnetic fields one by one.

10. The sheet processing apparatus of claim 1, wherein the plurality of coils each generate the magnetic fields at different timings such that only one of the plurality of coils is generating the magnetic field at any one instant of time.

11. The sheet processing apparatus of claim 1, wherein adjacent ones of the plurality of coils generate opposite magnetic fields.

12. The sheet processing apparatus of claim 1, wherein magnitudes of the magnetic fields generated by the plurality of coils are the same.

13. The sheet processing apparatus of claim 1, wherein shapes and numbers of turns of the plurality of coils are the same.

14. A sheet processing apparatus, comprising:
means for generating magnetic fields from a plurality of coils provided in an interface that feeds a sheet that has been taken in into a transport path;
means for calculating differential values between signals output from the plurality of coils; and
means for determining, on a basis of the differential values, whether a foreign object has entered the interface, wherein
each of the plurality of coils is arranged to surround a corresponding kicker roller of a plurality of kicker rollers such that a portion of each of the plurality of kicker rollers penetrates an opening formed by each of coils.

15. The sheet processing apparatus of claim 14, wherein a reference value is set in advance for each of the plurality of coils, and
the sheet processing apparatus further comprises
means for calculating first differential values between the signals output from the plurality of coils and the reference values for the plurality of coils and second differential values between the first differential values for the plurality of coils; and
means for determining, on a basis of the second differential values, whether a foreign object has entered the interface.

16. A sheet processing apparatus, comprising:
a plurality of coils configured to generate magnetic fields, the plurality of coils positioned at an interface of the sheet processing apparatus that is configured to receive a sheet that has been taken in and to feed the sheet into a transport path of the sheet processing apparatus;
a plurality of kicker rollers configured to kick the sheet toward a gate configured to receive the sheet;
a stage on which the sheet is stacked and which is provided with a plurality of openings for allowing a portion of each kicker roller of the plurality of kicker rollers to protrude; and
circuitry configured to determine, on a basis of differential values between signals output from the plurality of coils, whether a foreign object has entered the interface, wherein
the plurality of coils are foreign object detection coils configured to output different signals depending on whether there is a foreign object nearby, and
each of the plurality of coils is arranged in correspondence with an arrangement of the plurality of kicker rollers such that each of the plurality of coils is arranged to surround a corresponding opening of the plurality of openings.

* * * * *